United States Patent
Bathula

(10) Patent No.: US 12,536,544 B2
(45) Date of Patent: Jan. 27, 2026

(54) AUTOMATED VALIDATION OF SUSPICIOUS ACTIVITY REPORT NARRATIVES USING GENERATIVE ARTIFICIAL INTELLIGENCE

(71) Applicant: ACTIMIZE LTD, Ra'anana (IL)

(72) Inventor: Kiran Kumar Bathula, Mandamarri (IN)

(73) Assignee: ACTIMIZE LTD., Ra'anana (IL)

(*) Notice: Subject to any disclaimer, the term of this patent is extended or adjusted under 35 U.S.C. 154(b) by 0 days.

(21) Appl. No.: 18/422,858

(22) Filed: Jan. 25, 2024

(65) Prior Publication Data
US 2025/0245664 A1    Jul. 31, 2025

(51) Int. Cl.
*G06Q 20/40*        (2012.01)
*H04L 9/40*         (2022.01)

(52) U.S. Cl.
CPC ................ *G06Q 20/4016* (2013.01)

(58) Field of Classification Search
None
See application file for complete search history.

(56) References Cited

U.S. PATENT DOCUMENTS

| 12,008,649 | B1* | 6/2024 | Gordon, III | H04L 9/0643 |
| 2014/0324677 | A1* | 10/2014 | Walraven | G06Q 20/4016 705/39 |
| 2021/0272106 | A1* | 9/2021 | Hayner | G06Q 20/389 |
| 2021/0295338 | A1* | 9/2021 | Kreth | G06N 3/047 |
| 2022/0020026 | A1* | 1/2022 | Wadhwa | G06N 5/022 |
| 2022/0122062 | A1* | 4/2022 | Mayblum | G06Q 20/381 |

* cited by examiner

*Primary Examiner* — Bennett M Sigmond
*Assistant Examiner* — Bhavin D Shah
(74) *Attorney, Agent, or Firm* — Haynes and Boone, LLP

(57) ABSTRACT

An autonomous fraud/AML reporting system and methods are provided that are configured to automate validations of SAR narratives using a generative AI service by an automated SAR narrative system. The system includes a processor and a computer readable medium operably coupled thereto, the computer readable medium comprising a plurality of instructions stored in association therewith that are accessible to, and executable by, the processor, to perform narrative validation operations which include receiving a SAR narrative for a SAR, loading a prompt template associated with validating the SAR narrative by the generative AI service, injecting the narrative into the prompt templates, and generating and storing the validation based on the comparing.

20 Claims, 8 Drawing Sheets

AUTOMATED VALIDATION OF SUSPICIOUS ACTIVITY REPORT NARRATIVES USING GENERATIVE ARTIFICIAL INTELLIGENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) and machine learning (ML) systems and models, such as those that may be used for anti-money laundering (AML) and fraud detection with financial institutions, and more specifically to a system and method for automating generation and validation of suspicious activity report (SAR) narratives using generative AIs including large language models (LLMs).

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Financial crimes, such as money laundering, fraud, and other illicit activities, threaten the financial industry by undermining trust, integrity, and stability that users have in their financial institutions. These crimes may cause significant damages in both financial and reputational terms. Financial institutions have responded by implementing various risk management and investigation techniques to mitigate these risks. These require specific systems, departments, and trained agents and investigators to resolve such crimes, prevent further crimes, recover lost or stolen funds, and/or identify bad actors and fraudulent entities. However, fraud is constantly changing and new strategies, vulnerabilities, or other vectors by which fraud can be conducted and/or financial institutions exploited are constantly being identified by bad actors. As such, the ever-evolving landscape of financial crimes presents an ongoing and formidable challenge when identifying and investigating financial crimes. For example, traditional fraud and risk alert investigation processes and procedures rely heavily on manual processes and efforts by investigators, and therefore struggle to keep pace with the increasingly sophisticated techniques that criminals employ. Further, investigators face overwhelming data volumes, intricate patterns, and the urgency of timely decision-making.

Financial crime investigation agents may be required to file SARs and narratives with governing bodies across the globe. However, due to the complex nature of financial crimes and large quantities of data, investigation agents conventionally work with and analyze hundreds of fields manually in order to summarize those fields and create SARs while following regulatory guidelines that vary in granularity. There are additional challenges as well, such as the variety of data, human errors, validations and review, time windows, and the like. As such, an investigator may spend up to an hour when writing a SAR narrative depending on the complexity of the SAR and/or financial crime. Further, reviewing SARs and their narratives is also time and effort intensive. A reviewer may spend a similar amount of time when reviewing the SAR form and narrative, which leads to further delays and additional time inefficiencies. Accuracy of these narratives may depend on the reviewer and time spent, which leads to inconsistencies and wasted resources.

As such, finding a solution to these technical problems with fraud/AML investigation automation may be required to streamline SAR narrative generation and validation, provide accurate and timely insights for generated SARs and narratives, and maintain data security for SAR data. Thus, it is desirable to automate labor-intensive processes, reduce investigator time, and enhance financial crime detection and investigation efficiency. Therefore, there is a need for an automated, intelligent, and efficient computing system and framework that can automate generation and validation of SAR narratives with minimal user efforts and input, thereby improving system and time efficiency.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
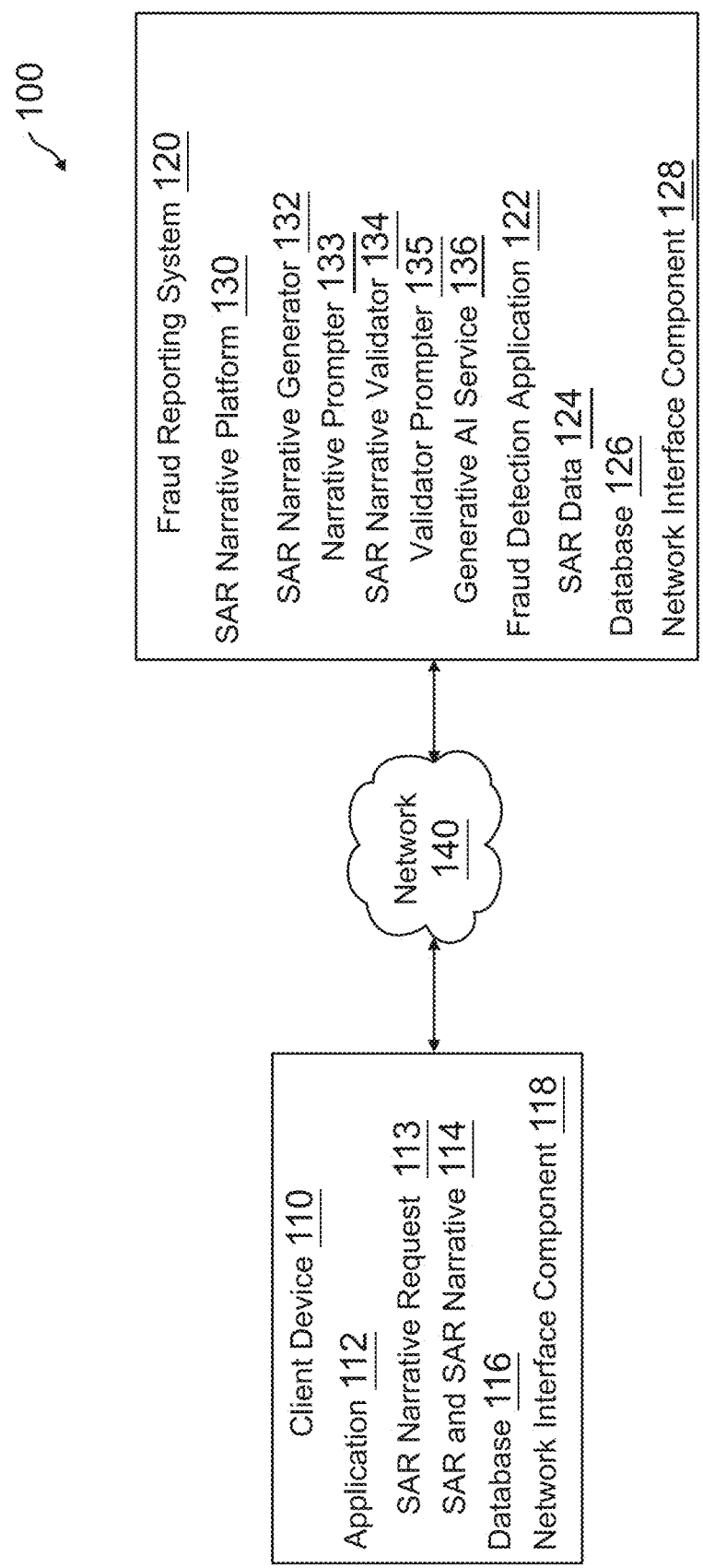
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Financial crime investigation agents may file SARs and narratives with governing bodies across the globe to assist with identifying and preventing fraud. SARs may be mandated by certain jurisdictions, practices, and/or institutions such that SARs may be regulated and standardized for use by many different parties. To properly file SARs, investigation agents often manually work with hundreds of different data fields. The investigation agents may then be required to then summarize the data from those fields and findings from analyzing the activities while following regulatory guidelines that vary in granularity and restrictiveness. Generation of narratives for these summaries by different investigation agents further comes with additional challenges, such as the variety of data, different human errors, review and validation of narratives, time windows to create narratives and/or complete investigations to submit SARs, and the like.

In order to programmatically analyze, assess, and process SARs for fraud/AML investigations, fraud activities or events, suspicious activities or events, money laundering, or other financial crimes, an intelligent and automated computing system and framework according to this disclosure may be utilized to generate and validate SARs using generative AI services and systems, such as conversational AIs, LLMs, generative pretrained transformers (GPTs), and the like. The SAR narrative framework and system may utilize generative AIs, LLMS, GPTs, and the like that may implement conversational AIs and chatbots, reinforcement ML, recommendation systems, decision-making algorithms, and other related components to create an intelligent and autonomous or semi-autonomous SAR (or other report or document) narrative generator and validator. ML and neural network (NN) algorithms and techniques may be utilized for training and enabling the SAR narrative system and framework to learn from large amounts of data and adapt to evolving financial crimes and SAR documents and forms, thereby generating useful, insightful, and accurate narratives from SARs. Trained, online, and/or continuous learning ML models and techniques allow the SAR narrative system to improve narrative and summarization techniques, enhance accuracy, and properly validate narratives.

ML models may be built on different tenants of a fraud detection, reporting, and/or ML modeling system, such as different financial institutions, using historical or past activities, transactions, and/or other model training data. Fraud detection is a process that detects and prevents (i.e., minimizes frequency and/or amount, or completely avoids) fraudsters from obtaining money or property illegally, through fraud, or other misappropriation. This may include detecting, alerting, and/or blocking fraudsters from obtaining money or property fraudulently, as well as investigations after fraud has been conducted to identify and prosecute those fraudsters, claw back ill-gotten gains, and/or protect from further fraud. Fraudulent activities may include money laundering, cyberattacks, fraudulent banking claims, forged bank checks, identity theft, and other illegal and/or malicious practices and conduct. When fraudulent activities occur or are suspected, SARs may be generated, which may correspond to documents, reports, files, forms, and the like that include data for the corresponding fraudulent or detected and reported activity. SARs may have different SAR fields and SAR data in those fields that record and document the corresponding activity. Summarizing such fields, data, and the like in the reports conventionally requires significant manual resources, efforts, and time.

In order to solve the issues with manual SAR narrative generation based on large data sets and increasingly complex and innovative fraud patterns and data, one or more AI models may be used to create the narrative procedurally through generative and/or conversational AI including use of LLMs for automated and intelligent context and memory capabilities by machines. This may include the use of GPT-4 or other GPTs, LLMs (e.g., Claude-2), or the like to provide conversational and/or generative AI during fraud/AML investigations and for SAR narrative generation and validation. For example, an LLM may provide natural language processing to analyze and understand large amounts of textual data related to financial transactions, customer information, regulatory requirements, and other relevant sources. By leveraging LLMs, generative AI services may provide natural language processing capabilities, allowing prompting for responses that analyze and interpret large amounts of SAR data with accuracy and speed, thereby summarizing relevant SAR data and/or validating SAR narratives when comparing to their underlying SARs. LLMs and other generative AI may learn on past data use when evaluating SARs and narratives.

A computing service and framework may be coded, deployed, and made available to investigators and other investigation agents that automatically generates SAR narratives based on form data using generative AI models that may include and/or utilize LLMs (e.g., Claude-2), GPTs (e.g., GPT-4, GPT-3.5), and the like. This may provide improved efficiency and accuracy to SAR narrative generation by automating all or most of the efforts that investigation agents are required to perform when creating narratives from SAR reports. However, agents may be provided options to add input, modify, and/or update the narratives manually, for example, if it is determined that the narratives may be off target from the SAR data, missing important details, or otherwise incorrect. This further allows for iterative and/or continuous learning for the models, such as through reinforcement learning.

Once the agent is satisfied with the narrative, the agent may then save the narrative, which will persist the narrative to a database for lookup, distribution, or other use. This may include distribution with the SAR to one or more reporting agencies, security teams or fraud detection units, customers, and the like. The computing service and framework may also validate SAR narratives automatically and internally using generative AI models and/or LLMs. Validation may be performed by the computing service extracting details from the narratives and then comparing the details with the corresponding data in the forms for the SARs. By procedurally matching and comparing, the AI models may be used to report any mismatches or gaps in the details present in the narrative text, which further simplifies the task of a reviewer or other investigation agent's manual efforts with improved accuracy and efficiency.

In this regard, the computing service may leverage generative AI and LLMs by integrating such models in the framework to create new services that implement and provide access to such models to the investigation agents, reviewers, and the like. The service may not rigidly specify a specific AI model but allows different, better suited, and/or more advanced models to be used, exchanged, and/or updated through the same services in a "plug-and-play" manner. As such, the framework allows for the implementation and maintenance of new AI services in a cloud computing environment. Further, the computing service may not be restricted to perform all calls to the generative AI and/or LLM just once or in a single job. Instead, the narrative may be generated piece-by-piece or by providing examples through prompts and feedback, which allows for more specific and targeted narratives and validations of such narratives. As such, agents and financial institutions may still influence the narratives generated without being required to configure and utilize generative AIs and LLMs directly, for example, through AI prompt engineering and prompt templates that cause specific AI responses.

As such, specific data for AML, fraud, and other SAR filings may be used to train generative AIs and LLMs, as well as prompt such models during an inference stage, to provide for intelligent and automated generation of SAR narratives. Further, the computing service and framework may extract details from a narrative using domain knowledge of AML, fraud, and SAR filings. To do so, specific generative AIs and LLMs may be trained and identified that can reliably generate quality text for SAR narratives, and further such models may be used to evaluate and validate narratives irrespective of how the narratives are created (e.g., manually by agents or automatically by a generative AI and/or LLM).

The embodiments described herein provide methods, computer program products, and computer database systems for an ML system that programmatically processes, evaluates, and provides SAR narratives, as well as validates those narratives and other narratives irrespective of their source (e.g., real agent, automated computing process or application, etc.). A financial institution, or other service provider system having one or more financial institutions as customers or other tenants, may therefore include and/or utilize a fraud detection and/or reporting system that may implement a SAR narrative system as described herein. The framework of intelligent automation for fraud and other risk reporting via SARs and SAR narratives, as well as for similar forms, documents, and/or reports, may provide investigators with a powerful tool for effectively evaluating, researching, and adjudicating on fraud/AML investigations. Models may be specifically trained and deployed for SAR narrative generation and validation through generative AI prompting, which allows for faster and more efficient SAR processing. This provides a comprehensive and systematic approach to generate and validate SAR narratives while reducing manual efforts and wasted system resources.

According to some embodiments, in an ML system accessible by a plurality of separate and distinct organizations, ML algorithms, features, and models are provided of a SAR narrative system for providing SAR narrative generation and validation, thereby providing faster, more efficient, and more precise ML model evaluation and processing of SARs and SAR narratives.

Example System and Computing Environment

The system and methods of the present disclosure can include, incorporate, or operate in conjunction with, or in the environment of, an ML engine, model, and intelligent system, which may include an ML or other AI computing architecture that provides narrative generation and validation for suspicious activity reports (SARs). FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, ML models, NNs, and other AI architectures have been developed to improve predictive analysis and classifications by systems in a manner similar to human decision-making, which increases efficiency and speed in performing predictive analysis on datasets requiring machine predictions, classifications, and/or analysis. One or more devices and/or servers may be operated and/or maintained by the same or different entities.

FIG. 1 illustrates a block diagram of an example environment 100 according to some embodiments. Environment 100 may include a client device 110 and a fraud (and/or AML) reporting system 120 that interact over a network 140 to provide intelligent fraud/AML investigation using SAR narrative generation and validation to streamline and optimize fraud and other risk alert investigation processes, as discussed herein. In other embodiments, environment 100 may not have all of the components listed and/or may have other elements instead of, or in addition to, those listed above. In some embodiments, environment 100 is an environment in which a SAR narrative generation 132 and a SAR narrative validator 134 may prompt and/or execute ML and NN models, such as LLMs and other generative AIs to orchestrate the tasks required for SAR narrative generation and validation. As illustrated in FIG. 1, fraud/AML reporting system 120 might interact via a network 140 with client device 110 to generate, provide, and output SAR narratives and validations of SAR narratives for fraud or other risk alert investigations.

For example, in fraud/AML reporting system 120, fraud detection applications 122 may provide and/or process SAR data 124 from fraud detection and risk analysis using one or more ML or NN models, such as LLMS, GPTS, and other generative and/or conversation AI of fraud detection engines that intelligently respond to prompts. These may include ML fraud detection engines may use ML models that are trained for fraud detection, SAR narrative generation, and/or conversational responses generally, on a per-tenant basis, and/or based on other training data. Fraud flags and/or reports may be generated manually from detected fraud or suspected fraud, and SAR reports may result from such detected or suspected fraud. Those SAR reports may include and/or be based on SAR data 124, which may be detected and/or determined by fraud detection ML models. The ML models for detecting SAR data 124 by fraud detection applications 122, as well as providing SAR narrative generation and validation, may include offline and/or online ML models, where offline ML models may be trained and deployed based on a training data set and online ML models may provide continuous learning and adaptation to new and changing datasets, such as emerging trends using live or streaming data. As such, fraud/AML reporting system 120 may be utilized to provide ML operations to tenants, customers, and other users or entities via fraud detection applications 122, which may include detecting and processing SAR data 124 and corresponding SARs.

To investigate real or potential fraud being flagged in SARs based on SAR data 124, SAR narrative platform 130 may be invoked and utilized to intelligently generate and validate SAR narratives, as discussed herein. Fraud detection applications 122 may therefore provide fraud detection services used by SAR narrative platform 130 for SAR narrative generation and validation, which may include and/or be utilized in conjunction with computing services provided by and/or to customers, tenants, and other users or entities accessing and utilizing fraud/AML reporting system 120. ML fraud detection engines of fraud detection applications 122 may be executed by fraud/AML reporting system 120 and/or provided to be utilized with other ML systems and models, such as those managed by separate computing systems, servers, and/or devices (e.g., tenant-specific or tenant-controlled servers and/or server systems that may be separate from SAR narrative platform 130 discussed herein). Client device 110 may include an application 112 that provides an SAR narrative request 113 for a SAR and/or fraud/AML investigation and receives SAR and SAR narrative 114 including a procedurally generated SAR with corresponding narrative, as well as validation of such narrative, for purposes of the corresponding fraud/AML investigation.

SAR narratives may be created and validated by SAR narrative platform 130 using generative AI models, as discussed herein. Where a service for SAR narrative generator 132 and SAR narrative validator 134 may be made available to investigation agents, SAR narratives may be created and processed based on form data automatically using one or more of generative AI services 135, which significantly reduces the manual efforts that are required by investigation agents. To do so, SAR narrative generator 132 may utilize a narrative prompter 133, which may utilize different generative AI prompts and prompting strategies to call generative AI services 136 with one or more requests, statements, questions, queries, or the like that are designed to elicit a response that allows for SAR narrative generation. As such, narrative prompter 133 may generate or construct prompts from prompt templates updated with data from a SAR and/or fields in the SAR, which may be used to call one or more of generative AI services 136 using a prompting strategy. Responses from generative AI services 136 may then be used to generate and store a SAR narrative by SAR narrative generator 132. Agents may be provided options and processes to modify or update the narratives manually if the narratives require changes or are missing important details.

Once an agent is satisfied with the narrative, the narrative may be stored and persisted to databases 126 and 116. The narrative may then be accessed, reviewed, and/or processed by one or more entities, computing devices or servers, or the like, such as when reviewing one or more SARs, investigating a financial crime, or the like. For SAR narrative validation by SAR narrative validator 134, a service of the system and framework may be created and executed to validate SAR narratives automatically and internally (e.g., within the fraud detection and/or reporting system without requiring external review by agents or other entities) using generative AI services 136. Similar to narrative prompter 133, a validator prompter 135 may be used to create, generate, and/or update prompt templates for a prompting strategy to prompt one or more of generative AI services 136 for responses. These prompts may instead be designed to elicit responses that may be used to validate a SAR narrative, such as to ensure completeness, check accuracy, prevent or minimize generative AI "hallucinations" (e.g., false or AI created SAR data from previous samples, training data, or learning that does not match a corresponding SAR), and/or other issues in narrative generation. Validator prompter 135 may therefore access, update, and/or create prompts and compare, through calls, prompts, and prompting strategies, SAR narratives to SAR data in their corresponding SAR. When validating the SAR narratives, SAR narrative validator 134 and/or generative AI services 136 may extract details from the narrative and then compare those details with the data from the SAR form and fields, which allow for identification and reporting of any mismatches or gaps in the narrative text.

As such, SAR narrative platform 130 may leverage generative AIs, LLMs (e.g., Claude-2) GPTs including GPT-4, and the like to integrate such models for generative AI services 136 to create new AI services for SAR narrative generator 132 and SAR narrative validator 134 for fraud investigators. SAR narrative platform 130 does not rigidly specify a specific generative AI model. As such, generative AI models, LLMs, GPTs, and other models may be modularly added or removed based on changes, advancements, and the like, which can be leveraged using the same services. Further, SAR narrative platform 130 is not restricted to calling generative AI services 135 once or a limited number of times, and a narrative may be generated piece-by-piece or by providing examples, although single calls may be preferred in certain embodiments. Although generative AI services 135 are shown as internal and residing with fraud/AML reporting system 120, in other embodiments, external or third-party AI services and platforms may be similarly called. Further, validation of SAR narratives may be performed irrespective of how the narrative is created, including validating manually create SAR narratives from investigation agents. As such, automated fraud detection and reporting systems of fraud/AML reporting system 120 may be improved by working more efficiently through automation of SAR narrative creation and validation. The operations, components, and models of SAR narrative platform 130, such as those of SAR narrative generator 132 and SAR narrative validator 134, are discussed in further detail below with regard to FIGS. 2-7.

For ML models (e.g., decision trees and corresponding branches, NNs, clustering operations, etc.) including those used by SAR narrative generator 132, SAR narrative validator 134, and/or generative AI services 136, the models may be trained using training data, which may correspond to stored, preprocessed, and/or feature transformed data associated with SARs and SAR narratives, as well as other conversational skills. With continuous and/or reinforcement training, live streaming data from one or more production, live, and/or real-time computing environments and/or feedback from different entities may be used. Model training and configuring may include performing feature engineering and/or selection of features or variables used by ML models.

Features or variables may correspond to discreet, measurable, and/or identifiable properties or characteristics.

ML and NN models used by fraud/AML reporting system 120 may be trained using one or more ML algorithms, operations, or the like for modeling (e.g., including configuring decision trees or neural networks, weights, activation functions, input/hidden/output layers, and the like). Thus, one or more ML models, NNs, or other AI-based models and/or engines may be trained for fraud detection or another ML task. The training data may be labeled or unlabeled for different supervised or unsupervised ML and NN training algorithms, techniques, and/or systems. Fraud/AML reporting system 120 may further use features from such data for training, where the system may perform feature engineering and/or selection of features used for training and decision-making by one or more ML, NN, or other AI algorithms, operations, or the like (e.g., including configuring decision trees, weights, activation functions, input/hidden/output layers, and the like).

An ML model may then be trained using a function and/or algorithm for the model trainer, as well as other ML systems, trainers, and operations for model and/or engine training and development. The training may include adjustment of weights, activation functions, node values, and the like. After initial training of ML models using supervised or unsupervised ML algorithms (or combinations thereof), ML models may be evaluated and/or released in a production computing environment. ML models may be deployed to take and process input data for model features and predict labels or other classifiers from the input data. Offline ML models may be released and implemented in a static manner, such as without updating and/or updating through release of new versions that may be deployed at specific times and by bringing one or more of fraud detection applications 122 offline for updating, versioning, patching, and the like. In contrast, deployed online ML models may be initially trained and/or configured for training, and may continuously learn as data is streamed and/or provided during decision-making.

One or more client devices and/or servers (e.g., client device 110 using application 112) may execute a web-based client that accesses a web-based application for fraud/AML reporting system 120, or may utilize a rich client, such as a dedicated resident application, to access fraud/AML reporting system 120, which may be provided by fraud detection applications 122 to such client devices and/or servers. Client device 110 and/or other devices or servers may utilize one or more application programming interfaces (APIs) to access and interface with fraud detection applications 122 and/or ML fraud detection engines of fraud/AML reporting system 120 in order to access, review, and evaluate SARs and other reports or documents for fraud/AML investigations using the operations discussed herein. Interfacing with fraud/AML reporting system 120 may be provided through fraud detection applications 122 and/or SAR narrative platform 130, and may be based on data stored by databases 126 and 116 of fraud/AML reporting system 120 and/or a database 116 of client device 110.

Client device 110 and/or other devices and servers on network 140 might communicate with fraud/AML reporting system 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and fraud/AML reporting system 120 may occur over network 140 using a network interface component 118 of client device 110 and a network interface component 128 of fraud/AML reporting system 120. In an example where HTTP/HTTPS is used, client device 110 might include an HTTP/HTTPS client for application 112, commonly referred to as a "browser," for sending and receiving HTTP//HTTPS messages to and from an HTTP//HTTPS server, such as fraud/AML reporting system 120 via the network interface component.

Similarly, fraud/AML reporting system 120 may host an online platform accessible over network 140 that communicates information to and receives information from client device 110. Such an HTTP/HTTPS server might be implemented as the sole network interface between client device 110 and fraud/AML reporting system 120, but other techniques might be used as well or instead. In some implementations, the interface between client device 110 and fraud/AML reporting system 120 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

Client device 110 and other components in environment 100 may utilize network 140 to communicate with fraud/AML reporting system 120 and/or other devices and servers, and vice versa, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol. Further, one or more of client device 110 and/or fraud/AML reporting system 120 may be included by the same system, server, and/or device and therefore communicate directly or over an internal network.

According to one embodiment, fraud/AML reporting system 120 is configured to provide webpages, forms, applications, data, and media content to one or more client devices and/or to receive data from client device 110 and/or other devices, servers, and online resources. In some embodiments, fraud/AML reporting system 120 may be provided or implemented in a cloud environment, which may be accessible through one or more APIs with or without a corresponding graphical user interface (GUI) output. Fraud/AML reporting system 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, client device 110, shown in FIG. 1, executes processing logic with processing components to provide data used for fraud detection applications 122 and/or SAR narrative platform 130 of fraud/AML reporting system 120, such as during fraud/AML investigations of SAR data 124 and the like using SARs and SAR narratives. In some embodiments, this may include processing SAR narrative request 113 and providing SAR and SAR narrative 114. In one embodiment, client device 110 includes application servers configured to implement and execute software applications as well as provide related data, code, forms, webpages, platform components or restrictions, and other information, and to store to, and retrieve from, a database system related data, objects, and web page content. For example, fraud/AML reporting system 120 may implement various functions of processing logic and processing components, and the processing space for executing system processes, such as running applications for fraud/AML investigations and/or other risk analysis and fraud detection capabilities. Client device 110 and fraud/AML reporting system 120 may be accessible over network 140. Thus, fraud/AML reporting system 120 may send and receive data to client device 110 via network interface component 128. Client device 110 may be provided by or through one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients. Client device 110 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to fraud/AML reporting system 120 that provides one or more APIs for interaction with client device 110.

Thus, client device 110 and/or fraud/AML reporting system 120 and all of their components might be operator configurable using application(s) including computer code to run using a central processing unit, which may include an Intel Pentium® processor or the like, and/or multiple processor units. A server for client device 110 and/or fraud/AML reporting system 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and fraud/AML reporting system 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

SAR Narrative System

Figure 2:
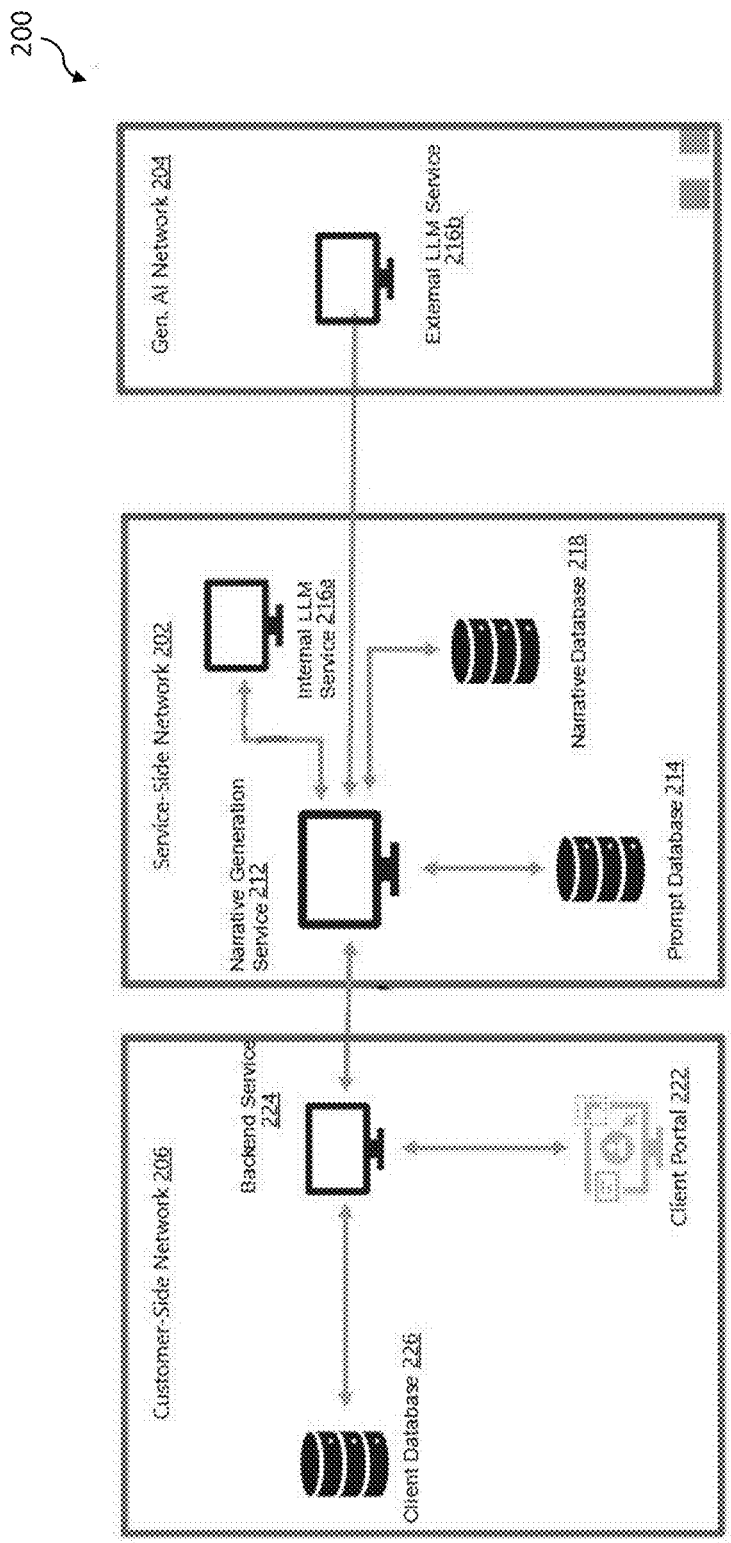
FIG. 2 is a simplified system architecture of a fraud/AML investigation and/or reporting system that may interact with generative AI services for generating and validating SAR narratives according to some embodiments.

FIG. 2 is a simplified system architecture 200 of a fraud/AML investigation and/or reporting system that may interact with generative AI services for generating and validating SAR narratives according to some embodiments. System architecture 200 of FIG. 2 includes a service-side network 202 interacting with a generative AI network 204 and a customer-side network 206 to perform generation and validation of narratives from reports, such as SAR narratives from SARs corresponding to detected and/or suspected fraud and fraud/AML investigations. In this regard, service-side network 202 may be executed by the operations and components of fraud/AML reporting system 120 including SAR narrative platform 130 discussed in reference to environment 100 of FIG. 1. In this regard, system architecture 200 displays the interactions of service-side network 202 for purposes of generating and validating narratives from form reports and/or other documents, such as SARs, which may include interacting with generative AI network 204 and customer-side network 206 for narrative generation and/or output.

A service provider, such as a fraud detection system and/or server(s) (e.g., fraud/AML reporting system 120) may implement and deploy a SAR narrative service discussed herein, which is shown in system architecture 200. Service-side network 202 may correspond to the main service responsible for generating the narrative and communicating with other components during SAR narrative generation and validation. This service may contain orchestration logic to identify the scenario and task for SAR narrative generation based on the input data and run the steps or operations during SAR narrative generation and validation. For example, customer-side network 206 may transmit requests for SAR narratives to service-side network 202, which may be processed to return a SAR narrative, as well as validate that narrative and others. Generative AI network 204 may be invoked during SAR narrative generation and/or validation where other, third-party, or external generative AIs, LLMs, and the like may be prompted and used.

Service-side network 202 includes a narrative generation service 212 that may contain orchestration logic to identify the scenario based on the input data and run appropriate steps. Narrative generation service 212 may take the input for the SAR narrative generation and/or validation request, perform data cleaning and data preparation, identify and load the appropriate prompt templates from a prompt database 214, create updated prompts that have the preprocessed input data embedded, and call internal LLM service 216a and/or external LLM service 216b in a specific order defined in the code with the prompts to obtain and/or validate a SAR narrative. Narrative generation service 212 may use the prompts to extract details corresponding to different sections. With validations, narrative generation service 212 may perform a comparison of the extracted details (e.g., in JSON format with JSON format input).

Prompt database 214 may provide appropriate prompt texts to narrative generation service 212 on request, and a narrative database 218 may be used to store SAR narratives and validation messages or results. As such, narrative database 218 may correspond to a storage for the input and output, as well as validation results of narrative generation service 212. The input may be used for storage of queries for auditing and analysis of the output of narrative generation service 212. Internal LLM service 216a may correspond to the service that allows narrative generation service 212 to interact with internally hosted generative AI models, such as LLMs and/or GPTs for internal generative and/or conversational AIs of service-side network 202. Internal LLM service 216a may process the instructions given via each prompt and return a text in response, which may be combined to form the SAR narrative, as well as validate the narrative. As such, internal LLM service 216a may also follow the instructions given via each prompt and return a text that contains information that is then used to validate the narrative. Similarly, external LLM service 216b may correspond to a service from an external, third-party, and/or vendor entity that allow for interaction with their corresponding and/or proprietary generative AI models. External LLM service 216b may function similarly to follow instructions to generate and/or validate the narrative, and may be accessible via APIs and called through API calls.

A client portal 222 of customer-side network 206 may correspond to a user interface component of an investigation portal service that is usable (e.g., via an Internet browser or resident software application) by an investigation agent. Client portal 222 may initiate the process of narrative generation and validation and display the generated narrative and validation messages. This may include one or more interactable, clickable, or selectable buttons or other interface elements. Backend service 224 may be responsible for communicating between the user interface and narrative generation service 212, as well as a client database 226. Backend service 224 may process the request for the SAR narrative generation and/or validation from the user interface or the like of client portal 222, which may include performing a database lookup in client database 226 for additional information, such as transaction details or other SAR data. Backend service 224 may call narrative generation service 212 and receive responses from narrative generation service 212, which may be passed back to client portal 222. Backend service 224 may run on a server and allow for storage of the narrative and/or validation messages to client database 226. As such, client database 226 may correspond to a relational database responsible for storing and returning additional information needed to generate a SAR narrative and store the generated narrative. Client database 226 may store additional information, such as transaction details, so that backend service 224 may look up such information as needed, as well as store the narratives so that they can be persisted. FIG. 2 is further described below with regard to FIG. 3 when performing SAR narrative generation and validation.

Figure 3:
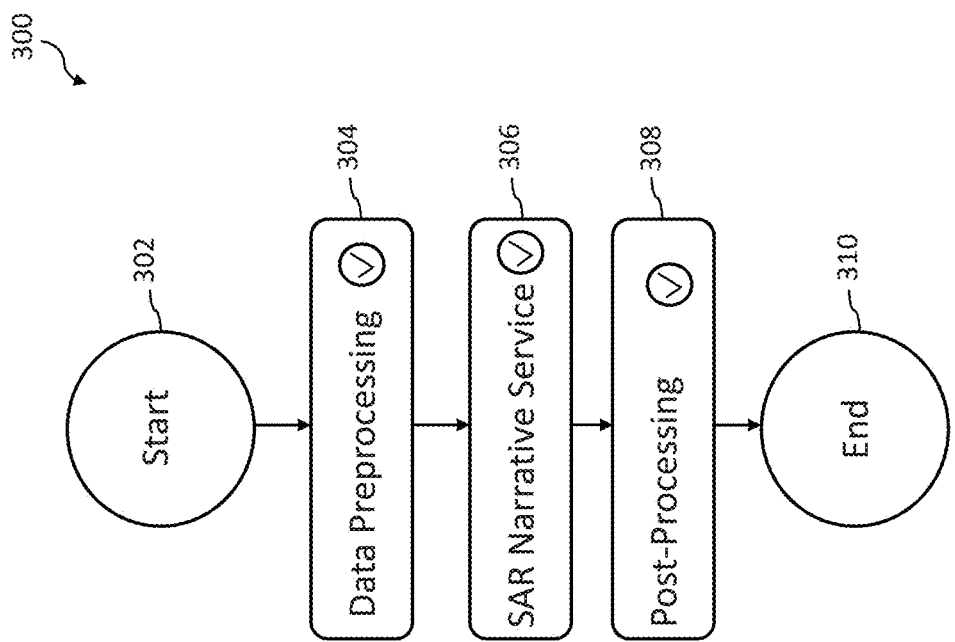
FIG. 3 is a simplified diagram of an exemplary flowchart executed by a SAR narrative system that automates generation and validation of SAR narrative by prompting a generative AI according to some embodiments.

FIG. 3 is a simplified diagram of an exemplary flowchart 300 executed by a SAR narrative system that automates generation and validation of SAR narrative by prompting a generative AI according to some embodiments. In flowchart 300, a high level flow of the SAR narrative generation and validation operations is shown, with further detail shown in FIGS. 4-7. In this regard, narrative generation service 212 may correspond to a component of SAR narrative platform 130 that performs SAR narrative generation and validation, which may execute the steps of flowchart 300.

Flowchart 300 may correspond to a diagram of a step function for SAR narrative generation and validation. As such, flowchart 300 may start at step 302, such as when a request for a SAR narrative is received from a client. The client may be a user endpoint or an automated endpoint, such as a user request or an automated request, respectively, that includes or identifies a SAR narrative. For example, service-side network 202 may receive the input from customer-side network 206 or other client that is requesting SAR narrative generation and providing a SAR or other data object, form, description, or the like for a SAR. Narrative generation service 212 may serve as a service-side client, system, application, and/or platform for SAR narrative generation and validation. In this regard, narrative generation service 212 may interact with a prompt database 214 to generate prompts that cause a generative AI, such as an LLM, GPT, or the like to respond with conversational dialog or other information allowing for SAR narrative generation and/or validation. Such generative AIs may be provided by an internal LLM service 216a or an external LLM service 216b depending on modular functionality and enabling of different generative AIs and ML or NN models for conversational or generative AI skills. Narrative database 218 may be used for SAR and SAR narrative storage.

Narrative generation service 212 of service-side network 202 may receive a request for SAR narrative generation from client portal 222 via backend service 224, which may include any necessary data from client database 226 (e.g., a SAR, client or customer ID, etc.). At step 304, narrative generation service 212 may perform data cleaning and data preparation steps for generative AI and/or LLM processing by internal LLM service 216a or external LLM service 216b, which may include preparing the data in a format, structure, or the like capable of being handled by the corresponding model and/or model engine/processor. At step 306, narrative generation service 212 may then identify and load the appropriate generative AI and/or LLM prompt templates into local memory from prompt database 214, as well as create updated prompts for the generative AI and/or LLM of internal LLM service 216a or external LLM service 216b. The prompts may have the preprocessed input data embedded therein with further instructions for the generative AI and/or LLM. One or more calls may then be made to internal LLM service 216a or external LLM service 216b in a specific order as defined by the computing code for the prompts to obtain a SAR narrative from the generative AI and/or LLM, as well as to validate such narrative where narrative validation may be performed. As such, the prompts may cause the generative AI and/or LLM of internal LLM service 216a or external LLM service 216b to procedurally generate the SAR narrative through responding to the prompts as the call(s) is/are made in the specified order.

In this regard, prompts may correspond to text or other input that contains information and instructions to a generative AI model or LLM of internal LLM service 216a or external LLM service 216b. The prompts may be configured to obtain a desired output in the form of a response (e.g., text or other output data) to the information and instructions. These may be conversational responses or other AI responses that may be used for SAR narrative generation and/or validation. The prompts may be created based on guidelines set by the regulatory bodies for financial crimes and/or SARs, type of SAR form used, structure of the input data, and the prompting strategies that may be identified as most effective. As such, prompts may be developed for narrative generation service 212 based on past high-quality responses and narratives for SAR reports. Prompting may therefore correspond to a technique of providing instructions as part of the input to the model on how the model should generate a corresponding output. As such, the prompts may instruct the model of internal LLM service 216a or external LLM service 216b how to generate a SAR narrative corresponding to some input data for a SAR, where the input data may also be passed to the generative AI and/or LLM as part of the prompt. Since not all prompts may create the same type and/or quality of output, specific prompting strategies that receive good quality SAR narratives from generative AIs and/or LLMs may be identified and used by the SAR narrative service. Thus, these prompt templates may be stored to prompt database 214. Narrative generation service 212 may store and persist the SAR narrative, as well as any data for validation of the narrative, when generated in narrative database 218.

At step 308, post-processing and validation may be performed on the SAR narrative by narrative generation service 212 once generated from the responses by internal LLM service 216a or external LLM service 216b. To create the final narrative, post-processing may include writing the input and narrative to a data container stored by narrative database 218, which allows for auditing and improving the system through reinforcement learning. The narrative and a status code for the narrative and SAR report (e.g., a code or identifier corresponding to an adjudication or decision on the SAR) may be added to a response object for transmission over customer-side network 206 to client portal 222. A response, for example, the created and stored response object for the SAR narrative, may be returned to backend service 224 and the narrative may then be made available to client portal 222 on-demand and/or responsive to requests from client portal 222 and/or different users and systems. Client database 226 may also be used for storage of the SAR narrative and/or narrative validation.

During validation, the computing service and framework for narrative generation service 212 may the identify and load the appropriate validation prompt templates into local memory from prompt database 214, which may be used for prompts to the generative AI and/or other LLM of internal LLM service 216a or external LLM service 216b to validate the narrative. Prompts from the templates may be used to extract details corresponding to different sections of the narrative, such as subject information, filings and impacted financial institutions, summary and details of the suspicious or fraudulent activity, and other narrative information. The details may be extracted from the narrative in a JavaScript Object Notation (JSON) format or data container, file, and/or data interchange formation for prompting, querying, and/or instructing the generative AI and/or LLM (e.g., based on the format of the data container in narrative database 218 or other preferred data and/or container format). The prompts may then be provided as input to the generative AI and/or LLM of internal LLM service 216a or external LLM service 216b, which may perform a comparison of the extracted details (e.g., in JSON format with the input for the prompts also in the JSON format). A narrative validation result may be obtained, which may be stored with the input and narrative in narrative database 218, as well as returned to client portal 222 over customer-side network 206 via backend service 224. As such, a response for the validation may be returned with the narrative to the backend processor or system, which enables access to and/or use of the validation of the narrative with various services, users, and the like. Once completed, flowchart 300 may end at step 310. This SAR narrative generation and validation may utilize the prompts, prompt templates, and prompting strategies with additional operations and components discussed in connection with FIGS. 3-7 below.

Figure 4:
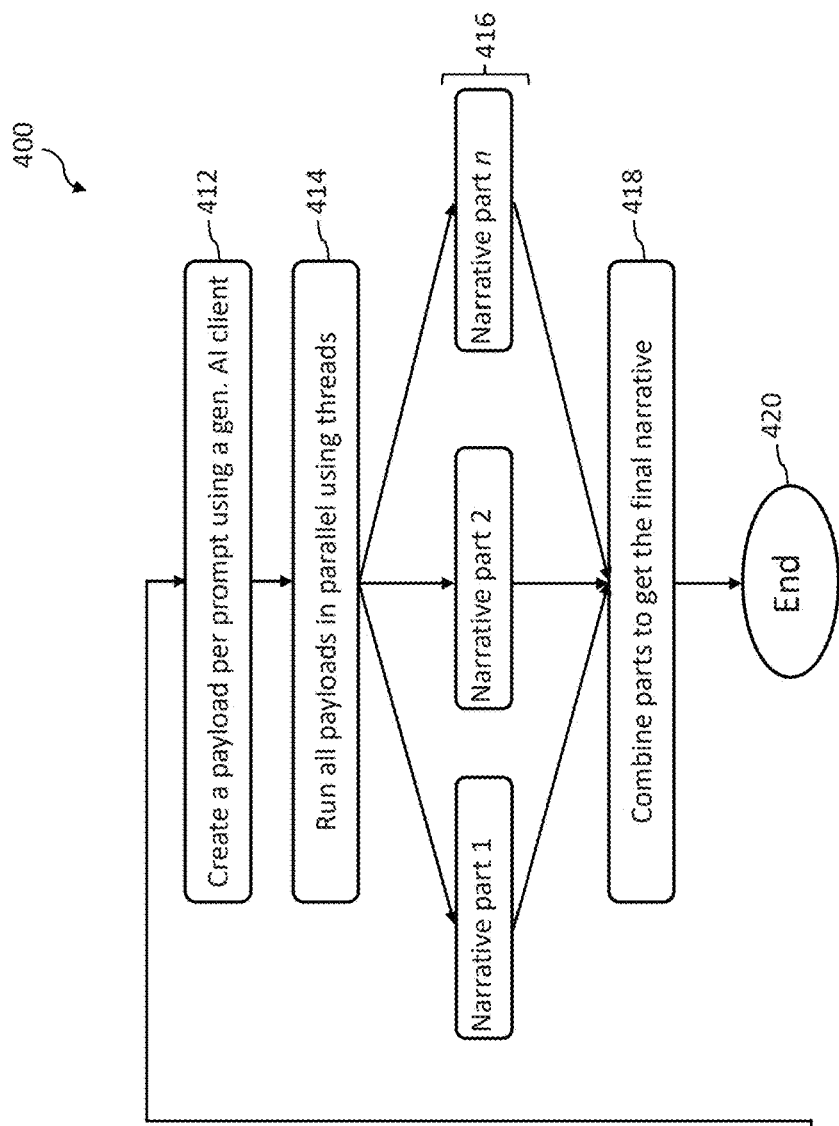
FIG. 4 is a simplified diagram of operations executed by a SAR narrative system for SAR narrative generation by prompting a generative AI using SAR data and prompt templates according to some embodiments.
Figure 4:
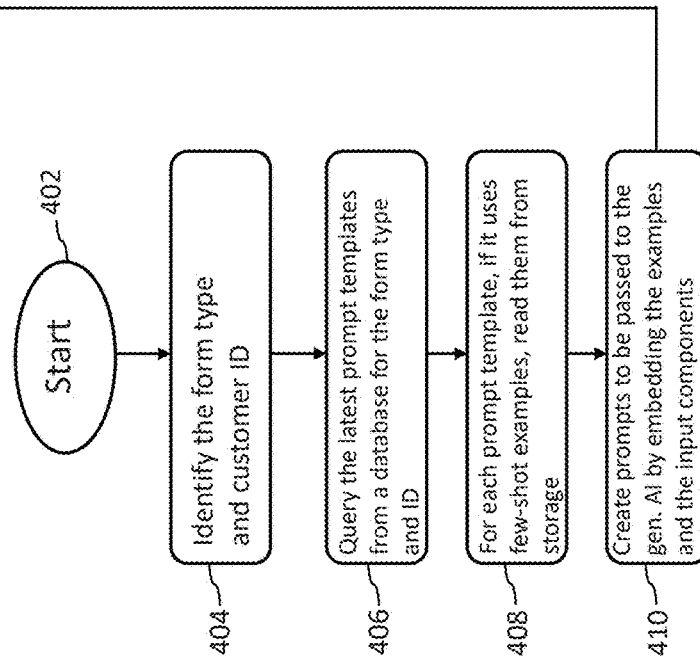

FIG. 4 is a simplified diagram 400 of operations executed by a SAR narrative system for SAR narrative generation by prompting a generative AI using SAR data and prompt templates according to some embodiments. Diagram 400 of FIG. 4 includes tasks, operations, and corresponding steps that may be executed by a SAR narrative service and/or system, such as one provided by fraud/AML reporting system 120 discussed in reference to environment 100 of FIG. 1, to provide SAR narrative generation. As such, a processing flow in diagram 400 may be performed by SAR narrative platform 130 of fraud/AML reporting system 120. In this regard, the processing flow in diagram 400 includes steps 402-420 that may be performed to prompt a generative AI when creating a SAR narrative from a SAR, prompt templates, and corresponding prompting strategies.

Diagram 400 starts at step 402, where a SAR narrative generator is initiated and/or utilized to execute the following steps for SAR narrative generation. At step 404, the form type and customer identifier (ID) or the like is determined for the SAR and corresponding SAR narrative generation request. This may be performed using a JSON Python library, which may identify the fields in the SAR form from a JSON object or container for the SAR. Further, SAR data may be extracted and used for prompt determination. At step 406, the latest prompt templates are queried from a database, such as an Amazon Web Services (AWS) Dynamo® database in a cloud environment, for the form type for the SAR (e.g., the corresponding templates for the SAR) and the customer tenant for the customer ID. Querying of the database may also be done using a Python library and may include querying against a database table with specific conditions. In an optional step 408, if the prompting strategy "few-shot examples" is used, for each prompt template the examples may be read from an online or cloud storage through running a fetch from the storage based on the prompt template identifiers or other information.

At step 410, prompts may be created that are to be passed to the generative AI service (e.g., LLM or the like) by embedding the examples, instructions, and the like with the input JSON components from the SAR. This may be done as a string concatenation operation in Python and may create and generate updated prompts having the extracted SAR data in input JSON form entered to the fields or portions of the prompt templates. In this regard, prompting may correspond to a technique of providing instructions as part of the input to the generative AI model on how the model should generate its output. The input prompt may contain instructions on how to generate a SAR narrative corresponding to some input data, which may be passed as part of the prompt. As such, prompts may correspond to text that contains such information and instructions to the generative AI model and may be based on the guidelines set by the regulatory bodies, type of SAR form used, structure of the input data, and different prompting strategies found to be effective.

A first type of prompting strategy and corresponding prompt templates may correspond to a "single zero-shot prompting call" technique where the instructions to generate a narrative are embedded in one prompt. The prompt does not contain any input-output examples and involves only one interaction with the LLM or other generative AI. A second type of strategy and templates may correspond to a "generation-by-parts" technique that generates the narrative by parts/sections. With generation-by-parts, one prompt is created and used to call the generative AI to generate one section of the narrative at a time and each prompt contains instructions to create each section. For faster processing, the technique can be parallelized so that sections are generated in parallel. Once all the sections are generated, the sections may be combined either through code that identifies each section from the response by the LLM or a final call to the LLM that identifies the sections and concatenates them in the expected order. This strategy does not contain any further input-output examples. Lastly, with a third type of prompting strategy and templates, a "few-shot prompting" technique may be used where the prompt contains examples of input-output pairs. The examples can be of any number allowable for the generative AI's or LLM's context window (e.g., max length of the input and output combined). This last technique may also be used with the aforementioned first and second techniques, where examples may improve the quality of the narrative and allow for influence of the resulting narrative without engineering the prompts per narrative and/or SAR.

At step 412, a payload is created per prompt using the generative AI client, which may then be run and/or passed to the generative AI for processing. These payloads are to be run by the generative AI, and at step 414, all payloads for the prompts are run in parallel using processing threads and a concurrent library. This may involve creating multiple threads and running one payload/call to the generative AI in each thread. The generative AIs are based on deep learning algorithms and may utilize an AI transformer architecture. These generative AIs may process input as a sequence of "tokens" and generate outputs also as a sequence of tokens one at a time. However, hallucinations by the generative AI may be an issue, where hallucinations may correspond to a phenomenon where the models make up information even when the information is not available to the models in the process of generating a response or other text. To handle hallucinations, the prompts may include explicit instructions to use only the information available in the input and to refrain from providing any information that is not available in the input to create the narrative.

At steps 416, the generative AI generates the narrative(s) according to the instructions that are a part of the prompt(s). Any gaps arising due to new scenarios found in the data may be handled through updating the prompts or through new prompts for the new scenarios. At step 418, the parts and/or different versions of the narratives (e.g., from different prompts and/or prompting strategies) from steps 416 are combined to get the final narrative. Combining the different parts and/or parallel calls from steps 416 may be performed by string operations. After completed, diagram 400 ends at step 420 and the corresponding SAR narrative may be stored and persisted for further use.

Figure 5:
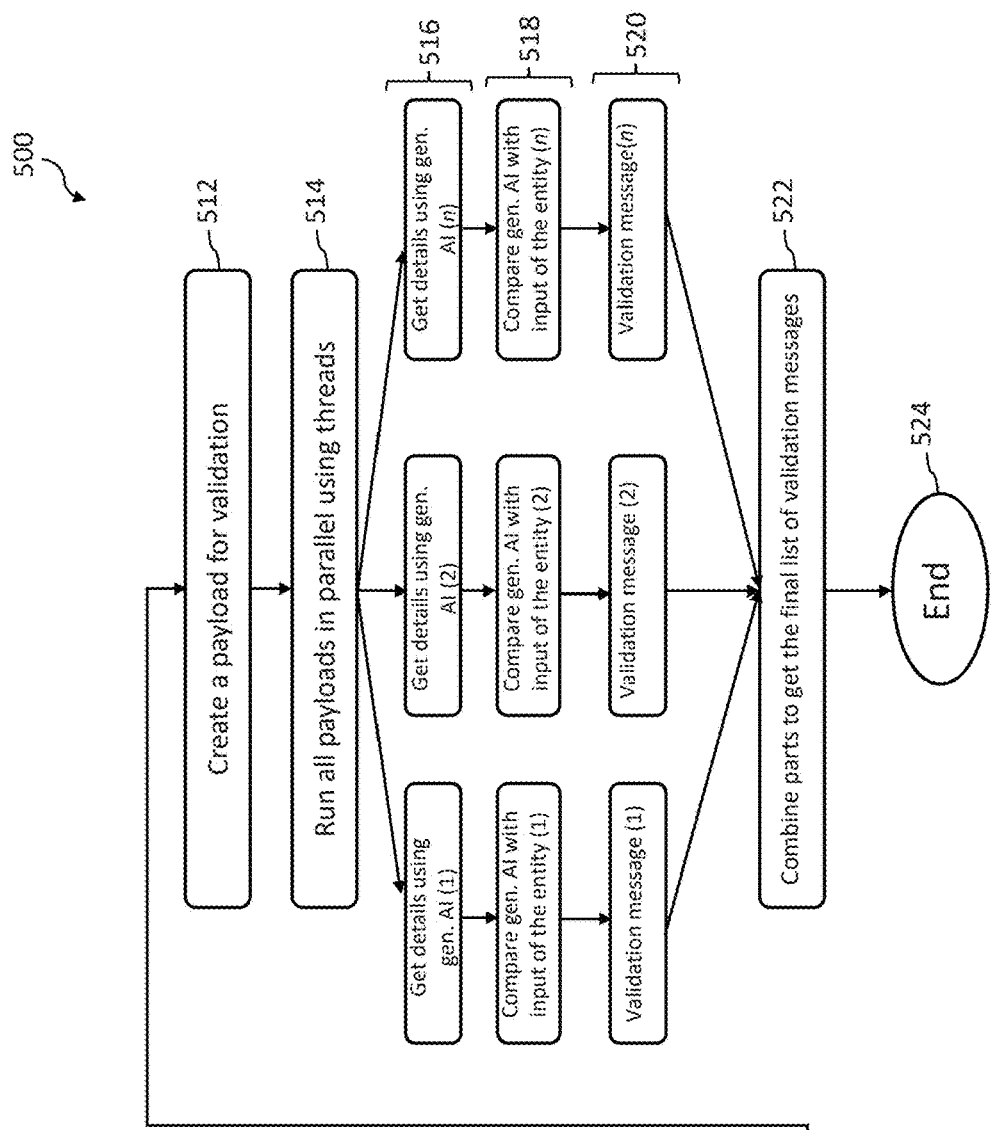
FIG. 5 is a simplified diagram of operations executed by a SAR narrative system for SAR narrative validation by prompting a generative AI to compare SAR narratives to SAR data in a SAR according to some embodiments.
Figure 5:
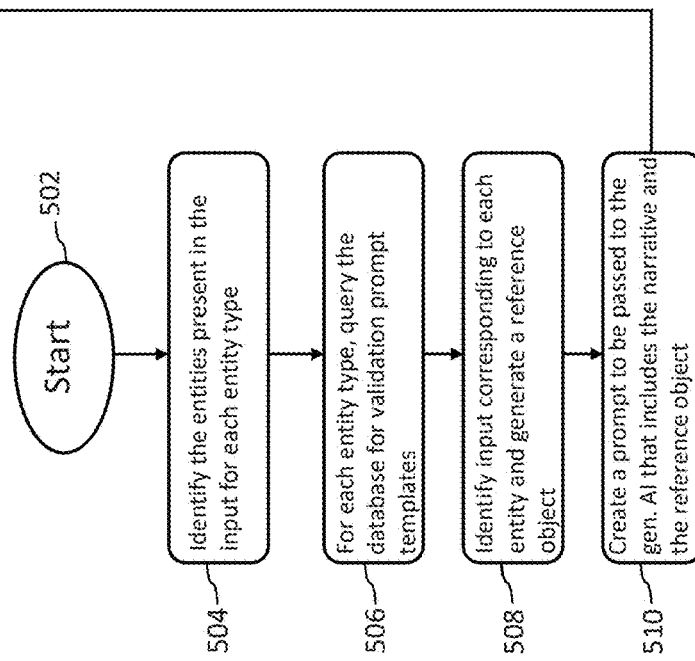

FIG. 5 is a simplified diagram 500 of operations executed by a SAR narrative system for SAR narrative validation by prompting a generative AI to compare SAR narratives to SAR data in a SAR according to some embodiments. Diagram 500 of FIG. 5 includes tasks, operations, and corresponding steps that may be executed by a SAR narrative service and/or system, such as one provided by fraud/AML reporting system 120 discussed in reference to environment 100 of FIG. 1, to provide SAR narrative validation. As such, a processing flow in diagram 500 may be performed by SAR narrative platform 130 of fraud/AML reporting system 120. In this regard, the processing flow in diagram 500 includes steps 502-524 that may be performed to prompt a generative AI and validate a SAR narrative from a SAR, SAR narrative, prompt templates, and corresponding prompting strategies.

Diagram 500 starts at step 502, where a SAR narrative validator is initiated and/or utilized to execute the following steps for SAR narrative validation. At step 504, the entities present in the input for each entity type are identified, which may be done using a JSON Python library. This may include parsing the JSON object, container, structure, or the like and identifying values corresponding to specific keys for the corresponding data. New and smaller JSON objects each containing details corresponding to one entity from the original JSON object or the like may be generated. At step 506, for each entity type, the SAR narrative validator queries the database for SAR validation templates, which may correspond to querying a table of the database using conditions associated with validating the SAR narrative using different prompts and/or prompting strategies. At step 508, for each entity type and for each entity of that type, input corresponding to the entity is identified and a reference JSON or other object is generated, such as using a JSON Python library. As such, the JSON object may be parsed, and the reference JSON or other object of the entity is then established as a copy of the entity's object with "True/False" as a value for strings and numbers for the reference object.

At step 510, a prompt is created that is to be passed to the generative AI that includes the narrative, and the reference object. For each prompt related to the entity type, a copy for each instance of the entity type is created by including the narrative and the reference object using a JSON Python library or the like. Prompting strategies may be utilized to create the prompts and select the prompt templates used for prompt creation. In this regard, different prompting strategies may be used for SAR narrative validation. With a first strategy, a simple question and answer (Q&A)-based validation may be used where the generative AI is asked simple and direct questions while passing the narrative for the generative AI to respond to the questions. An answer is compared with the information available in the input SAR to validate the result. By asking these questions the SAR narrative validator may cover a list of important components of the SAR form and/or SAR narrative, and validate that those important components are available, consistent, match, and are not fake or imagined (e.g., due to an AI hallucination) in the SAR narrative. To do this, the relevant information from the narrative is extracted by the generative AI in responses and those responses are compared against the SAR and SAR data in the fields of the SAR form itself. For example, questions for a prompt created at step 510 may include: "What is the name of the main suspect?" "What is the name of the filing institute?" "What is the total dollar amount involved in the activity?" or the like.

An "LLM-as-a-reviewer" technique or other similar second validation technique may instruct the LLM or other generative AI, through prompts, to act as a reviewer and provide messages to denote mismatches and gaps in the narrative while passing both the input and the narrative to the generative AI. Lastly, a third technique may instruct the generative AI to return a JSON object, where JSON may be selected as JSON may correspond to the same format as the input for faster and more compatible processing and as LLMs may have the capability to return output in a JSON format. As such, the prompt may include the expected JSON structure and the model may returns the same JSON structure containing values extracted from the narrative.

At step 512, a payload for the validation by the generative AI is created, such as in or with the client for the generative AI. For example, a payload containing the entity object, reference object, and the prompt for the entity (e.g., in JSON format) may be created using a library, such as a JSON Python library. At step 514, all payloads are run in parallel using different processing threads and a corresponding concurrent library. This may involve creating multiple threads and running one payload/call to the generative AI in each thread.

At steps 516, for each thread and concurrently running job and prompt, details are obtained by running the prompt to get a response from the generative AI. At steps 518, for each thread, the response is compared with the input of or for that entity. This may be done by running a Python or similar function to compare the response and object obtained from the LLM to the input and by matching the values for all keys in the corresponding data. Comparisons at step 518 may be performed in different manners. With comparison of details, depending on the field or details that are being compared, comparison between the value extracted from the narrative and the value present in the input may be performed. A reviewer may also determine if the values are matching/close/have the same or similar meaning. With a comparison option by data type, for different data types, comparisons may be made directly with each data type. For example, with fields that represent numerical quantities, such as transaction amounts, account number, etc., exact or different values may be used to match or calculate deviation. With fields that are strings, an exact match or similarity scoring can be used. For collections, missed values i.e., value present in input but not present in narrative, may be analyzed, and may account for extra/hallucination values i.e., values present in narrative but not present in input.

At steps 520, for each thread, validation messages are received, and all mismatches are aggregated into a list of messages (e.g., strings). Each validation string contains a field identifier and a message stating the gap/mismatch between the input SAR data and narrative corresponding to that field. This may be done using JSON objects and data with simple string and list operations in Python. Validation may be performed using these strings, and at step 522, the validation messages and other parts are combined to get the final list of validation messages. As such, all the messages from all threads are aggregated into one list of validation messages and the validation message list along with the narrative are returned as output.

Validation at step 522 may be performed by section of the SAR narrative. As such, the SAR narrative validator may validate different sections of the narrative against their counterparts in the input separately. This may assist with debugging issues, logging, and communicating the validation to the user more easily. As such, there may be prompts to validate each type of entity separately, such as subject information, filing institution, impacted parties or entities, suspicious activity and typology, transaction summary, validation of multiple entities, and the like. If there are multiple entities of the same type in the input, the same prompt may be run for each entity. The validation prompt may contain the reference prompt corresponding to one instance with placeholders for values that the generative AI model may fill after processing the narrative. Since the validation may be done independently for each entity type and in a loop for each instance of each entity type, the runs of all the prompts may be performed in parallel using a multi-threading based implementation. After which, diagram 500 ends at step 524 and the corresponding SAR narrative's validation and/or validation messages may be stored and persisted for further use, as well as sent with the SAR narrative for viewing by one or more users (e.g., fraud/AML investigation agents).

Figure 6:
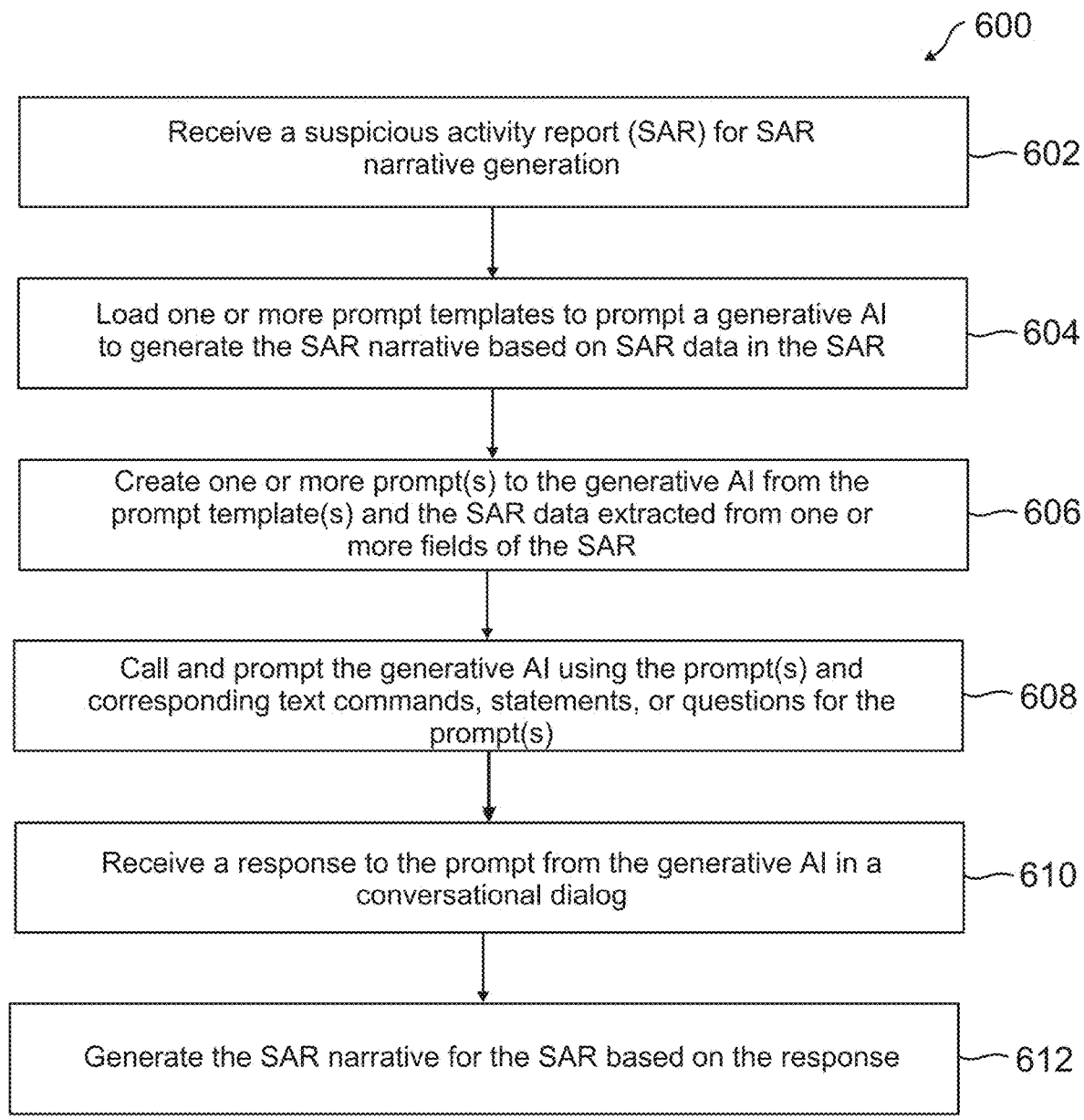
FIG. 6 is a simplified diagram of an exemplary flowchart for automating generation of SAR narratives using generative AIs according to some embodiments.

FIG. 6 is a simplified diagram of an exemplary flowchart 600 for automating generation of SAR narratives using generative AIs according to some embodiments. Note that one or more steps, processes, and methods described herein of flowchart 600 may be omitted, performed in a different sequence, or combined as desired or appropriate based on the guidance provided herein. Flowchart 600 of FIG. 6 includes operations executable by an autonomous SAR narrative system that generates SAR narratives for SARs and other investigation forms, documents, or the like, as discussed in reference to FIG. 1-5. One or more of steps 602-612 of flowchart 600 may be implemented, at least in part, in the form of executable code stored on non-transitory, tangible, machine-readable media that when run by one or more processors may cause the one or more processors to perform one or more of steps 602-612. In some embodiments, flowchart 600 can be performed by one or more computing devices discussed in environment 100 of FIG. 1.

At step 602 of flowchart 600, a SAR for SAR narrative generation is received. A SAR may correspond to a report or other data form, document, file, or structure that stores, documents, and reports SAR data. SAR data may correspond to fraud/AML investigation data, such as detected, identified, and/or suspected fraud activity. In this regard, one or more SAR fields or the like in the SAR may include SAR data used to process and generate a SAR narrative. The SAR narrative may therefore correspond to a summary or the like that provides a readable text form or format to the SAR data so that a reader, such as an investigation agent of fraud activity and/or investigation, may view a summarization of the relevant data in a more readable, sensical, efficient, and/or interpretable form. Based on the SAR, pre-processing and/or data cleaning steps may be performed prior to processing and/or calling a generative AI service for SAR narrative generation.

At step 604, one or more prompt templates to prompt a generative AI to generate the SAR narrative based on SAR data in the SAR is/are loaded. The prompt template(s) may correspond to a template for conversational dialog, such as a request, statement, question, query, or the like that is designed to elicit a response from a generative AI, such as in a conversational manner using a chatbot or other automated conversational AI application or process. The prompt templates may each correspond to a particular prompting strategy, which may be used to execute the calls in a specific order and/or manner to elicit the best, most preferred, or designed response. For example, each prompt strategy for SAR narrative generation may correspond to a separate manner used to call the generative AI service including a single zero-shot prompting call having instructions for SAR narrative generation in a single interaction call, a generation-by-parts of the SAR narrative having instructions for SAR narrative generation in multiple parallel calls made to the generative AI service for each section of the SAR narrative, multiple few-shot prompting calls having instructions for SAR narrative generation in a set of calls made to the generative AI service with one or more examples of input-output pair(s) for other SAR(s) and/or other SAR narrative (s), or other available and compatible prompting strategy.

At step 606, one or more prompts to the generative AI is/are created from the prompt template(s) and the SAR data extracted from one or more fields of the SAR. The prompts may be created by a SAR narrative generator by extracting SAR data from the fields in the SAR and creating an updated prompt by entering the extracted SAR data to one or more input fields or the like in the prompt templates. For example, an updated prompt may include SAR form data for a name of the identified or suspected fraudster or victim of fraud, date of incident, cause of fraud detection, activity, other affected parties, etc., which may be entered to a prompt that includes instructions for a generative AI to process the SAR data and provide a response used for SAR narrative generation.

At step 608, the generative AI is called and prompted using the prompt(s) and corresponding text commands, statements, queries, or questions for the prompt. Calling and prompting may include executing and/or transmitting one or more API calls, requests, or the like that include all or portions of the updated prompt having the SAR data. As such, the instructions may cause the generative AI to respond by processing the SAR data intelligently and providing a SAR narrative or responses used to construct and generate a SAR narrative. The instructions may include one or more sub-instructions configured to cause the generative AI to handle hallucinations by the generative AI service and remove or prevent usage of such hallucinations, where hallucinations may correspond to other data not included in the extracted SAR data in the response from the generative AI service. The generative AI may be called in a specified order designated by the prompt template selected, which may include or more individual calls done in parallel to improve speed and efficiency in prompt and response processing by the SAR narrative generator and generative AI.

At step 610, a response to the prompt is received from the generative AI, such as in a conversational dialog. The response may include the SAR narrative or may be used to create the SAR narrative based on different parts generated by the generative AI. As such, the fraud/AML reporting system and SAR narrative generator may receive a fully generated SAR narrative or may receive the SAR narrative piece-by-piece from the prompting and construct the SAR narrative. As such, at step 612, the SAR narrative is generated for the SAR based on the response. The SAR narrative may be generated as discussed above and then stored for use or further validation, as discussed below with regard to FIG. 7. A notification to a SAR reporting application, server, and/or system after generating and storing the SAR narrative may be transmitted, which may identify the data container and/or other data storage mechanism having the SAR narrative stored. This may indicate that the SAR narrative is available for use with the SAR and/or for validation.

Figure 7:
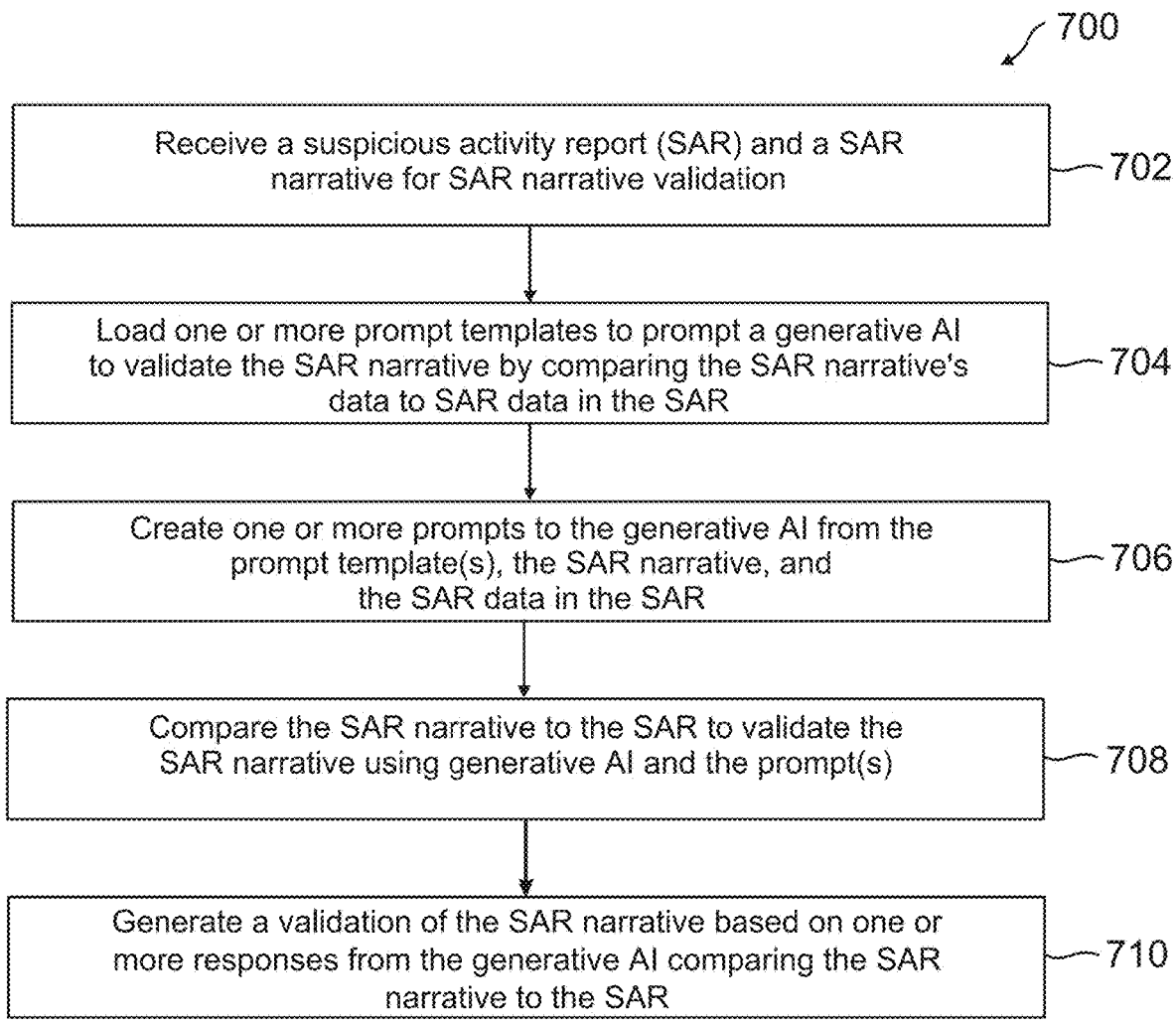
FIG. 7 is a simplified diagram of an exemplary flowchart for automating validation of SAR narratives using generative AIs according to some embodiments.

FIG. 7 is a simplified diagram of an exemplary flowchart 700 for automating validation of SAR narratives using generative AIs according to some embodiments. Note that one or more steps, processes, and methods described herein of flowchart 700 may be omitted, performed in a different sequence, or combined as desired or appropriate based on the guidance provided herein. Flowchart 700 of FIG. 7 includes operations executable by an autonomous SAR narrative system that validates SAR narratives using SAR data contained in their corresponding SARs or other investigation forms, documents, or the like, as discussed in reference to FIG. 1-5. One or more of steps 702-710 of flowchart 700 may be implemented, at least in part, in the form of executable code stored on non-transitory, tangible, machine-readable media that when run by one or more processors may cause the one or more processors to perform one or more of steps 702-710. In some embodiments, flowchart 700 can be performed by one or more computing devices discussed in environment 100 of FIG. 1.

At step 702 of flowchart 700, a SAR and a SAR narrative for SAR narrative validation is received. Similar to the description of step 602, a SAR may be received that corresponds to a fraud/AML investigation, detected or suspected fraud incident or activity, or the like, where the report may have one or more SAR fields or the like including SAR data. However, in contrast to step 602, instead a SAR narrative may accompany the SAR, which may correspond to a summary or the like that provides a readable text form and/or format to the SAR data in the report and report's fields. As such, the SAR and/or SAR narrative may be obtained from an upstream application, service, or client, may be retrieved from storage, and/or may be received from an investigation agent or the like during fraud/AML investigations.

At step 704, one or more prompt templates to prompt a generative AI to validate the SAR narrative by comparing the SAR narrative's data to SAR data in the SAR is loaded. Similar to prompt templates described with regard to step 604, prompt templates for SAR narrative validation may include instructions and fields that allow for entry of input from a SAR, but may differ by further including fields for SAR narratives and may utilize different templates, conversational dialog, requests, statements, questions, queries, or the like. These instructions and templates may therefore allow for comparing of SARs to SAR narratives, which may utilize different prompting strategies. For example, the strategies may include a question-and-answer-based validation technique that questions the generative AI with questions while passing the SAR narrative to the generative AI service to answer such question and/or compare questions and SAR data to the narrative. Other prompting strategies may include an LLM-as-a-reviewer technique that prompts an LLM of the generative AI to review the SAR narrative and identify any mismatches, gaps, or the like between the SAR narrative and the SAR data in the SAR and/or a strategy where instructions prompt the generative AI to return a JSON format data structure having SAR data values corresponding to SAR fields in the SAR, which are correlated with the SAR data and used to compare to the SAR narrative.

At step 706, one or more prompts to the generative AI is/are created from the prompt template(s), the SAR narrative, and the SAR data in the SAR. In a similar manner to step 606, a SAR narrative validator may create SAR narratives by extracting SAR data from the fields in the SAR but may also extract data from the SAR narrative for use in creating and/or updating a prompt template with data needed to prompt the generative AI. As such, the SAR narrative validator may create an updated prompt by entering the extracted SAR data and SAR narrative data to one or more input fields or the like in the prompt templates for SAR narrative validation. When generating the updated prompt, multiple prompt templates may be used so that multiple updated prompts are created, and validation of a SAR narrative may be run in parallel using a multithreading-based processing job and different prompt templates and strategies.

At step 708, the SAR narrative is compared to the SAR to validate the SAR narrative using the generative AI and the prompt(s). The comparing by the SAR narrative validator and generative AI may be performed for each section of the SAR narrative and/or for each entity of multiple entities present in the SAR narrative. The SAR narrative validator may call the generative AI based on the updated prompt(s) and prompting strategies to perform the comparison(s). In some embodiments, the prompting strategy causes the comparison(s) to be performed through multiple individual calls to the generative AI service in a specified order designated by the instructions for the different prompt templates being run. As such, during steps 706 and 708, further processing may include extracting critical information via calls to the generative AI service and comparing the extracted information with original information used to generate the narrative and/or extracting narrative data for the prompt template, creating an updated prompt based on the extracted narrative data and the prompt template, comparing, via calls to the generative AI service, the SAR narrative to the SAR using a prompting strategy and the updated prompt, and the like.

Based on this comparing, at step 710, a validation of the SAR narrative is generated based on one or more responses from the generative AI comparing the SAR narrative to the SAR. When validating, the response(s) may be used to determine if the SAR narrative and SAR match or have mismatches or gaps in data. Once validated, the results of the validation may be stored with the SAR narrative and/or SAR, as well as provided to one or more endpoints, entities, or the like for use in reviewing and changing the SAR and/or configuring the generative AI for better or more accurate SAR narrative generation (e.g., through continuous or reinforcement learning). The validation may therefore include both a validation result (e.g., percentage score or the like) and issues with the SAR narrative in capturing and summarizing the SAR.

As discussed above and further emphasized here, FIGS. 1-7 are merely examples of fraud/AML reporting system 120 and corresponding methods for a SAR narrative system that generates and validates SAR narratives, which said examples should not be used to unduly limit the scope of the claims. One of ordinary skill in the art would recognize many variations, alternatives, and modifications.

Figure 8:
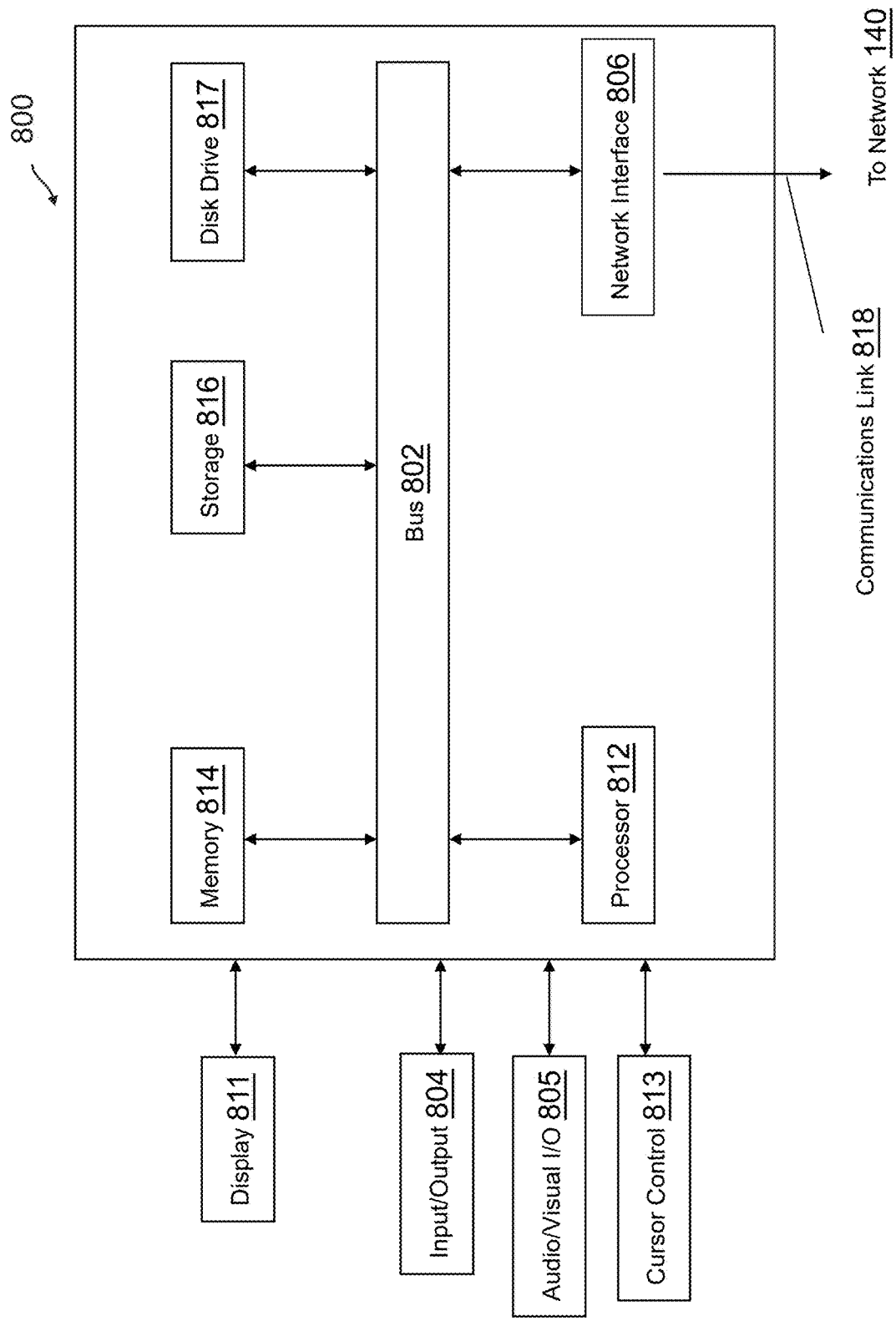
FIG. 8 is a simplified diagram of a computing device according to some embodiments.

FIG. 8 is a block diagram of a computer system 800 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons, image, or links, and/or moving one or more images, etc., and sends a corresponding signal to bus 802. I/O component 804 may also include an output component, such as a display 811 and a cursor control 813 (such as a keyboard, keypad, mouse, etc.). An optional audio/visual input/output component 805 may also be included to allow a user to use voice for inputting information by converting audio signals. Audio/visual I/O component 805 may allow the user to hear audio, and well as input and/or output video. A transceiver or network interface 806 transmits and receives signals between computer system 800 and other devices, such as another communication device, service device, or a service provider server via network 140. In one embodiment, the transmission is wireless, although other transmission mediums and methods may also be suitable. One or more processors 812, which can be a micro-controller, digital signal processor (DSP), or other processing component, processes these various signals, such as for display on computer system 800 or transmission to other devices via a communication link 818. Processor(s) 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor(s) 812 and other components by executing one or more sequences of instructions contained in system memory component 814. Logic may be encoded in a computer readable medium, which may refer to any medium that participates in providing instructions to processor(s) 812 for execution. Such a medium may take many forms, including but not limited to, non-volatile media, volatile media, and transmission media. In various embodiments, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An automated suspicious activity report (SAR) narrative system configured to automate validations of SAR narratives using a generative artificial intelligence (AI) service, the automated SAR narrative system comprising:
   a processor and a computer readable medium operably coupled thereto, the computer readable medium comprising a plurality of instructions stored in association therewith that are accessible to, and executable by, the processor, to perform narrative validation operations which comprise:
      receiving a SAR narrative for a SAR, wherein the SAR narrative includes an explanation of SAR data included in the SAR;
      parsing a JavaScript Object Notation (JSON) object for the SAR narrative for one or more entities present in the explanation of the SAR data using a software library;
      generating a plurality of new JSON objects for each of the one or more entities based on parsing the JSON object for the SAR narrative;
      loading a prompt template into a local memory of the automated SAR narrative system, wherein the prompt template is associated with validating the SAR narrative by the generative AI service, and wherein the prompt template includes instructions to the generative AI service that cause a validation of the SAR narrative for the SAR and details of the SAR that are used for the validation of the SAR narrative;
      extracting, from the plurality of new JSON objects and the SAR narrative, narrative data corresponding to one or more of the details;
      generating a prompt to the generative AI service based on the extracted narrative data and the prompt template, wherein the generating the prompt comprises:
         identifying input fields of the prompt template that correspond to the extracted narrative data and the one or more of the details,
         inserting the extracted narrative data into the input fields, and
         creating the prompt based on the prompt template having the extracted narrative data inserted to the input fields;
      comparing, via one or more calls to the generative AI service, the SAR narrative to the SAR data included in the SAR using a prompting strategy to the generative AI service and the prompt, wherein the prompting strategy uses one or more text commands made to the generative AI service through the one or more calls; and
      generating and storing the validation of the SAR narrative based on the comparing, wherein the storing comprises adding the validation to a data container including the SAR and the SAR narrative.

2. The automated SAR narrative system of claim 1, wherein prompting strategy utilizes a question-and-answer-based validation technique that questions the generative AI service with a plurality of questions from the prompt while passing the SAR narrative to the generative AI service.

3. The automated SAR narrative system of claim 1, wherein the prompting strategy utilizes a large language model (LLM)-as-a-reviewer technique that prompts an LLM of the generative AI service to review the SAR narrative and identify any mismatches, any gaps, or a combination thereof between the extracted narrative data and the SAR data in the SAR.

4. The automated SAR narrative system of claim 1, wherein the prompting strategy utilizes the instructions to prompt the generative AI service to return a JSON format data structure having SAR data values corresponding to a plurality of SAR fields for the SAR, and wherein the SAR data values in the JSON format data structure are correlated with the SAR data for use with the comparing.

5. The automated SAR narrative system of claim 1, wherein the comparing is performed by each section of a plurality of sections of the SAR narrative.

6. The automated SAR narrative system of claim 1, wherein the comparing is performed for each entity of a plurality of entities present in the SAR narrative.

7. The automated SAR narrative system of claim 1, wherein the prompt template is one of at least two prompt templates for use with the validation of the SAR narrative, and wherein each of the at least two prompt templates are used for creating corresponding prompts for the validation that are run in parallel with the generative AI service using a multithreading-based processing job.

8. The automated SAR narrative system of claim 7, wherein the prompting strategy causes the comparing to be performed through a plurality of individual calls to the generative AI service in a specified order designated by the instructions for the one of the at least two prompt templates being run.

9. The automated SAR narrative system of claim 1, wherein the generative AI service comprises at least one generative AI model including at least an LLM, and wherein the generative AI service provides a conversational AI that processes input conversational text corresponding to the prompt and provides output conversational text having the validation of the SAR narrative.

10. A method to automate validations of suspicious activity report (SAR) narratives using a generative artificial intelligence (AI) service for an automated SAR narrative system, the method comprising:
receiving a SAR narrative for a SAR, wherein the SAR narrative includes an explanation of SAR data included in the SAR;
parsing a JavaScript Object Notation (JSON) object for the SAR narrative for one or more entities present in the explanation of the SAR data using a software library;
generating a plurality of new JSON objects for each of the one or more entities based on parsing the JSON object for the SAR narrative;
loading a prompt template into a local memory of the automated SAR narrative system, wherein the prompt template is associated with validating the SAR narrative by the generative AI service, and wherein the prompt template includes instructions to the generative AI service that cause a validation of the SAR narrative for the SAR and details of the SAR that are used for the validation of the SAR narrative;
extracting, from the plurality of new JSON objects and the SAR narrative, narrative data corresponding to one or more of the details;
generating a prompt to the generative AI service based on the extracted narrative data and the prompt template, wherein the generating the prompt comprises:
identifying input fields of the prompt template that correspond to the extracted narrative data and the one or more of the details,
inserting the extracted narrative data into the input fields, and
creating the prompt based on the prompt template having the extracted narrative data inserted to the input fields;
comparing, via one or more calls to the generative AI service, the SAR narrative to the SAR data included in the SAR using a prompting strategy to the generative AI service and the prompt, wherein the prompting strategy uses one or more text commands made to the generative AI service through the one or more calls; and
generating and storing the validation of the SAR narrative based on the comparing, wherein the storing comprises adding the validation to a data container including the SAR and the SAR narrative.

11. The method of claim 10, wherein prompting strategy utilizes a question-and-answer-based validation technique that questions the generative AI service with a plurality of questions from the prompt while passing the SAR narrative to the generative AI service.

12. The method of claim 10, wherein the prompting strategy utilizes a large language model (LLM)-as-a-reviewer technique that prompts an LLM of the generative AI service to review the SAR narrative and identify any mismatches, any gaps, or a combination thereof between the extracted narrative data and the SAR data in the SAR.

13. The method of claim 10, wherein the prompting strategy utilizes the instructions to prompt the generative AI service to return a JSON format data structure having SAR data values corresponding to a plurality of SAR fields for the SAR, and wherein the SAR data values in the JSON format data structure are correlated with the SAR data for use with the comparing.

14. The method of claim 10, wherein the comparing is performed by each section of a plurality of sections of the SAR narrative.

15. The method of claim 10, wherein the comparing is performed for each entity of a plurality of entities present in the SAR narrative.

16. The method of claim 10, wherein the prompt template is one of at least two prompt templates for use with the validation of the SAR narrative, and wherein each of the at least two prompt templates are used for creating corresponding prompts for the validation that are run in parallel with the generative AI service using a multithreading-based processing job.

17. The method of claim 16, wherein the prompting strategy causes the comparing to be performed through a plurality of individual calls to the generative AI service in a specified order designated by the instructions for the one of the at least two prompt templates being run.

18. The method of claim 10, wherein the generative AI service comprises at least one generative AI model including at least an LLM, and wherein the generative AI service provides a conversational AI that processes input conversational text corresponding to the prompt and provides output conversational text having the validation of the SAR narrative.

19. A non-transitory computer-readable medium having stored thereon computer-readable instructions executable to automate validations of suspicious activity report (SAR) narratives using a generative artificial intelligence (AI) service for an automated SAR narrative system, the computer-readable instructions executable to perform narrative validation operations which comprise:
receiving a SAR narrative for a SAR, wherein the SAR narrative includes an explanation of SAR data included in the SAR;
parsing a JavaScript Object Notation (JSON) object for the SAR narrative for one or more entities present in the explanation of the SAR data using a software library;
generating a plurality of new JSON objects for each of the one or more entities based on parsing the JSON object for the SAR narrative;
loading a prompt template into a local memory of the automated SAR narrative system, wherein the prompt template is associated with validating the SAR narrative by the generative AI service, and wherein the prompt template includes instructions to the generative AI service that cause a validation of the SAR narrative for the SAR and details of the SAR that are used for the validation of the SAR narrative;
extracting, from the plurality of new JSON objects and the SAR narrative, narrative data corresponding to one or more of the details;
generating a prompt to the generative AI service based on the extracted narrative data and the prompt template, wherein the generating the prompt comprises:
identifying input fields of the prompt template that correspond to the extracted narrative data and the one or more of the details,
inserting the extracted narrative data into the input fields, and
creating the prompt based on the prompt template having the extracted narrative data inserted to the input fields;

comparing, via one or more calls to the generative AI service, the SAR narrative to the SAR data included in the SAR using a prompting strategy to the generative AI service and the prompt, wherein the prompting strategy uses one or more text commands made to the generative AI service through the one or more calls; and generating and storing the validation of the SAR narrative based on the comparing, wherein the storing comprises adding the validation to a data container including the SAR and the SAR narrative.

20. The non-transitory computer-readable medium of claim 19, wherein prompting strategy utilizes a question-and-answer-based validation technique that questions the generative AI service with a plurality of questions from the prompt while passing the SAR narrative to the generative AI service.

* * * * *